(12) United States Patent
Suzuki et al.

(10) Patent No.: US 8,968,569 B2
(45) Date of Patent: Mar. 3, 2015

(54) METHOD FOR RECYCLING WASTEWATER

(75) Inventors: Shigehiro Suzuki, Nagoya (JP); Motoharu Noguchi, Handa (JP); Hideki Kozono, Handa (JP)

(73) Assignee: Metawater Co., Ltd., Minato-Ku (JP)

( * ) Notice: Subject to any disclaimer, the term of this patent is extended or adjusted under 35 U.S.C. 154(b) by 738 days.

(21) Appl. No.: 12/343,759

(22) Filed: Dec. 24, 2008

(65) Prior Publication Data

US 2009/0127196 A1 May 21, 2009

Related U.S. Application Data

(63) Continuation of application No. PCT/JP2007/064574, filed on Jul. 25, 2007.

(30) Foreign Application Priority Data

Aug. 1, 2006 (JP) .................................. 2006-209349

(51) Int. Cl.
*B01D 61/04* (2006.01)
*C02F 1/44* (2006.01)
(Continued)

(52) U.S. Cl.
CPC .............. *B01D 61/04* (2013.01); *B01D 61/16* (2013.01); *C02F 9/00* (2013.01); *B01D 61/025* (2013.01);
(Continued)

(58) Field of Classification Search
CPC .... B01D 61/04; B01D 61/147; B01D 61/145; B01D 61/025; B01D 61/027; B01D 61/16; B01D 21/01; C02F 1/44; C02F 1/444; C02F 1/52; C02F 1/56; C02F 1/78; C02F 1/90; C02F 2201/782; C02F 2201/784; C02F 2209/003; C02F 2209/23; C02F 2311/04; C02F 2311/12; C02F 2311/2661; C02F 2325/30
USPC ............... 210/96.1, 96.2, 259, 639, 650, 652, 210/702, 709, 760, 806, 739, 712, 721, 726, 210/805; 422/186.07, 186.14
See application file for complete search history.

(56) References Cited

U.S. PATENT DOCUMENTS 2,055,808 A * 9/1936 Wait .............................. 210/760
5,114,576 A * 5/1992 Ditzler et al. .............. 210/195.1
(Continued)

FOREIGN PATENT DOCUMENTS

| CN | 1284933 A | 2/2001 |
|---|---|---|
| EP | 1 044 928 | 10/2000 |

(Continued)

OTHER PUBLICATIONS

Korean Office Action dated Apr. 22, 2013.
(Continued)

*Primary Examiner* — Joseph Drodge
(74) *Attorney, Agent, or Firm* — Burr & Brown, PLLC

(57) ABSTRACT

A method of wastewater reutilization by which reusable water can be stably obtained from a wastewater. Ozone is added to a wastewater, such as water resulting from sewage treatment, in such a small amount as to result in a residual ozone concentration as measured before membrane filtration of 0.01-1.0 mg/L. Ozone is thus brought into contact with fine solids contained in the wastewater to alter the surface properties of the fine solids so that the solids are easily to coagulate. Thereafter, a coagulant, e.g., PACl, is added from a coagulant addition device (3). The fine solids are coagulated in a coagulation tank (5) or a line mixer and the resultant water is subjected to membrane filtration with an ozone-resistant separation membrane (6) such as ceramic membrane. Thus, reusable water is obtained which has a residual ozone concentration, as measured after filtration through the membrane, less than 0.5 mg/L.

10 Claims, 4 Drawing Sheets

(51) Int. Cl.
*C02F 1/52* (2006.01)
*C02F 1/78* (2006.01)
*B01D 61/16* (2006.01)
*C02F 9/00* (2006.01)
*B01D 61/02* (2006.01)
*B01D 61/14* (2006.01)
*C02F 1/56* (2006.01)

(52) U.S. Cl.
CPC ............ *B01D 61/027* (2013.01); *B01D 61/145* (2013.01); *B01D 61/147* (2013.01); *B01D 2311/04* (2013.01); *B01D 2325/30* (2013.01); *C02F 1/444* (2013.01); *C02F 1/56* (2013.01); *C02F 1/78* (2013.01); *C02F 2201/782* (2013.01); *C02F 2201/784* (2013.01); *C02F 2209/003* (2013.01); *C02F 2209/23* (2013.01)
USPC .......... 210/639; 210/650; 210/702; 210/709; 210/739; 210/760

(56) References Cited

U.S. PATENT DOCUMENTS

| | | | |
|---|---|---|---|
| 5,470,461 A * | 11/1995 | Ban et al. | 210/188 |
| 5,478,468 A * | 12/1995 | Deno et al. | 210/208 |
| 5,785,864 A * | 7/1998 | Teran et al. | 210/739 |
| 6,423,235 B1 * | 7/2002 | Shimoi et al. | 210/760 |
| 6,464,877 B1 | 10/2002 | Mori et al. | |
| 6,638,421 B2 * | 10/2003 | Murayama et al. | 210/96.1 |
| 6,755,977 B2 * | 6/2004 | Brunsell | 210/648 |
| 2002/0148790 A1 * | 10/2002 | Krulik | 210/758 |
| 2003/0173300 A1 * | 9/2003 | Bradley | 210/665 |
| 2006/0175256 A1 * | 8/2006 | Masten et al. | 210/638 |
| 2007/0163958 A1 * | 7/2007 | Newcombe et al. | 210/650 |

FOREIGN PATENT DOCUMENTS

| | | |
|---|---|---|
| JP | 07-232197 A1 | 9/1995 |
| JP | 11-207369 A1 | 8/1999 |
| JP | 11-239789 A1 | 9/1999 |
| JP | 2000-107777 | 4/2000 |
| JP | 2000-350988 A1 | 12/2000 |
| JP | 2002-035554 A1 | 2/2002 |
| JP | 2002-079062 A1 | 3/2002 |

OTHER PUBLICATIONS

Moulin et al., *Interest of the ozone/coagulant combination for the potabilization of surface waters by crossflow microfiltration on mineral membranes*, Published by Trans Tech Publ. Zuerich, Switz, Proc 2 Int Conf Inorg Member ICIM2 91, Inorganic Membranes ICIM2-91, Jul. 1, 1991, p. 1.

* cited by examiner

METHOD FOR RECYCLING WASTEWATER

FIELD OF THE INVENTION

The present invention relates to a method for recycling wastewater, comprising membrane filtering various wastewaters such as treated sewage to give reusable water.

BACKGROUND OF THE INVENTION

To efficiently use water resources, there have been developed techniques of membrane-filtering various wastewaters to give reusable water. For example, Patent Documents 1 and 2 disclose methods for membrane-filtering wastewater used for washing a pool of a water purifying plant to reuse it as washing water. The methods described in Patent Documents 1 and 2 are intended to treat wastewater having relatively good quality. When wastewater is simply subjected to membrane-filtering, depending on the quality of the wastewater, these methods may become unable to work due to clogging of a membrane with organic matters and the like in the wastewater in a short time.

Techniques for preventing such clogging of a membrane include a method for adding ozone to raw water to decompose organic matters that cause clogging of a membrane, as described in Patent Documents 3 and 4. However, sufficient decomposition of organic matters requires a large amount of ozone. In Patent Document 3, in order to make ozone remaining on the surface of the membrane in an amount sufficient to decompose organic matters, a large amount of ozone is supplied such that a concentration of dissolved ozone in filtered water having passed through the membrane is 0.5 mg/L. In Patent Document 4, although a concentration of dissolved ozone in filtered water having passed through the membrane is 0.05 to 1.0 mg/L, ozone is further added to the filtered water in a subsequent process. Ozone generation is electricity guzzling, and thus addition of large amount ozone has a problem of high running cost. In addition, decomposition of organic matters progresses with a large amount of ozone to allow organic matters to pass through the membrane. These methods thus have a problem that when raw water is wastewater containing organic matters, filtered water having passed through the membrane has high concentration of remaining organic matters. For these reasons, there is little use of ozone to give reusable water from wastewater by membrane-filtration. Patent Documents 3 and 4 are intended to purify relatively clean raw water.

Patent Document 1: JP-A-1999-235587
Patent Document 2: JP-A-2001-87764
Patent Document 3: JP-A-2003-285059
Patent Document 4: Japanese Patent No. 3449248

SUMMARY OF THE INVENTION

Problem to be Solved by the Invention

Therefore, an object of the present invention is to provide a method for recycling wastewater, which can stably provide reusable water from wastewater containing organic matters while preventing clogging of a membrane at low cost.

Means for Solving Problem

A method for recycling wastewater according to claim 1 of the present invention, which has been made to solve the above problems, is characterized by comprising: adding a small amount of ozone to wastewater as raw water, to thereby contact the ozone with fine solids in the wastewater so as to modify the surface properties of the fine solids to be easy coagulating; adding a coagulant to coagulate the fine solids; and membrane filtrating the wastewater through a ozone-resistant separation membrane, wherein a concentration of dissolved ozone in the wastewater to which the ozone has been added is measured immediately before the step of coagulation, and an adding amount of the ozone is controlled to such an amount as that a concentration of dissolved ozone before membrane filtration is within the range of 0.01 to 1.0 mg/L to give reusable water in which a concentration of dissolved ozone after membrane-filtration is less than 0.5 mg/L.

A method for recycling wastewater according to claim 2 of the present invention, which has been made to solve the above problems, is characterized by comprising: adding a small amount of ozone to wastewater as raw water, to thereby contact ozone with fine solids contained in the wastewater so as to modify the surface properties of the fine solids to be easy coagulating; adding a coagulant to coagulate the fine solids; and membrane filtrating the wastewater through a ozone-resistant separation membrane, wherein a concentration of dissolved ozone in the wastewater to which the ozone has been added is measured between the steps of coagulation and membrane filtration, and an adding amount of the ozone is controlled to such an amount as that a concentration of dissolved ozone before membrane filtration is within the range of 0.01 to 1.0 mg/L to give reusable water in which a concentration of dissolved ozone after membrane-filtration is less than 0.5 mg/L.

In any invention, contacting ozone with the wastewater may be performed in an ozone contact column including an ozone generator, and contacting ozone with the wastewater may also be performed by supplying ozone into the wastewater with an ejector or a pump.

Effect of the Invention

According to the present invention, differing from prior art, ozone is added in a small amount in order to enhance coagulating property and a coagulant is used in combination to form easy coagulating flock of fine solids in wastewater, thereby clogging of a filtering surface of a separation membrane is prevented. An amount of ozone added to wastewater for this purpose is so small as that a concentration of dissolved ozone in wastewater before membrane-filtration is within the range of 0.01 to 1.0 mg/L and a concentration of dissolved ozone in wastewater after membrane-filtration is less than 0.5 mg/L. A running cost for ozone generation thus can be significantly reduced, compared with those of the prior art described in Patent Documents 3 and 4. In addition, excessive decomposition of organic matters can be prevented, and a concentration of remaining organic matters in membrane-filtered water can be controlled. Moreover, a membrane filtration flux can be increased to about double, compared with cases without ozone. Therefore, according to the present invention, even wastewater containing relatively large amount of organic matters such as treated sewage can be subjected to membrane-filtration for removal of fine solids in the wastewater to give reusable water.

Figure 1:
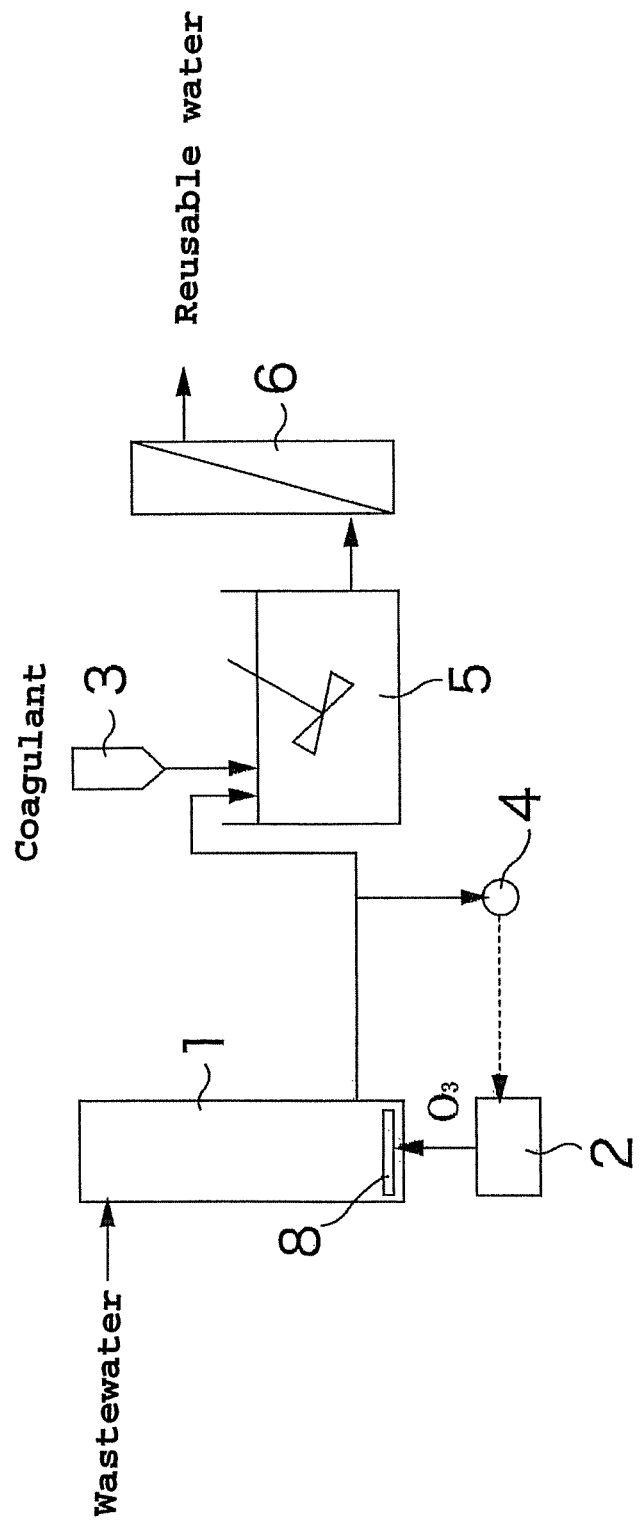
FIG. 1 is a flow sheet showing a first embodiment of the present invention.

DESCRIPTION OF REFERENCE NUMERALS 1 ozone contact column
2 ozone generator
3 coagulant addition device
4 ozone concentration meter
5 coagulation tank
6 separation membrane
7 line mixer
8 air diffuser
9 ejector

DETAILED DESCRIPTION OF THE INVENTION

Preferred embodiments of the present invention will be described below.

FIG. 1 shows a first embodiment of the present invention, in which reference numeral 1 denotes an ozone contact column; 2 denotes an ozone generator to supply ozone to the ozone contact column; 3 denotes a coagulant addition device; 4 denotes an ozone concentration measuring device; 5 denotes a coagulation tank; and 6 denotes an ozone-resistant separation membrane. Examples of raw water include treated water from sewage, sidestreams, industrial wastewater, water leachate from refuse, night soil, agricultural wastewater, lives-tock wastewater and aquaculture wastewater.

The wastewater, which is raw water, is firstly introduced into the ozone contact column 1, in which ozone is added to the wastewater. In the first embodiment, the wastewater contacts with ozone in a downward flow state. The wastewater may also be an upward flow state. Examples of a method for supplying ozone to the ozone contact column include installation of an air diffuser 8 such as an air diffusion cylinder or an air diffusion plate in the ozone contact column 1 and a method for dissolving ozone in the raw water with an ejector or a pump located outside the ozone contact column 1 and charging the raw water into the ozone contact column 1. By contacting to fine solids contained in the wastewater, ozone is used to modify the surface properties of the fine solids to be easy coagulating. A mechanism of modification of the surface properties of the fine solid by ozone remains to be academically elucidated fully, but is thought to be due to change in a surface electric charge of the fine solid, for example. Since the modification of the surface properties is carried out with a small amount of ozone in a very short time, a residence time is enough in about 0.1 to about 10 minutes. There are other materials consuming ozone than fine solids such as SS (suspended solid) and organic matters (COD), including $NO_2$—N.

In the present invention, a concentration of dissolved ozone in the wastewater released from the ozone contact column 1 is measured with the ozone concentration-measuring device 4 to control the ozone generator 2 so that the concentration is always within the range from 0.01 to 1.0 mg/L. A concentration of dissolved ozone higher than 1.0 mg/L does not provide higher effect of enhancing coagulation. Such a concentration will drive up a running cost due to an increased power consumption of the ozone generator 2 and have a problem that excessively decomposed organic matters remain in membrane-filtered at an increased concentration. When a concentration of dissolved ozone before membrane-filtration is less than 0.01 mg/L, an effect of enhancing coagulation is insufficient. The concentration of dissolved ozone before membrane-filtration is thus preferably within the range from 0.01 to 1.0 mg/L, more preferably not less than 0.01 mg/L and less than 0.5 mg/L, and even more preferably not less than 0.01 mg/L and less than 0.05 mg/L. A required amount of ozone is preferably reduced to control decomposition of organic matters. A combination use of the ozone concentration measuring device 4 and the ozone generator 2 enables to add a required amount of ozone that changes according to change of a concentration of ozone in raw water.

As described above, ozone is added to the wastewater to modify the surface properties of fine solids contained in the wastewater to be easy coagulating, and then to this is added a coagulant with the coagulant addition device 3. Any coagulant conventionally used can be used. Examples of the coagulant include PACl (Polyaluminium chloride), ferric chloride, aluminum sulfate, and polymer coagulants. The wastewater is then stirred at slow speed in the coagulation tank 5 to form flocks. Since a coagulation property is improved in the previous step, flocks having good coagulation property are formed.

The wastewater released from the coagulation tank 5 is membrane-filtered through the separation membrane 6. The separation membrane 6 must be of an ozone-resistant material. Examples of the membrane that can be used include ceramic membranes and ozone-resistant polymer membranes such as PVDF. The separation membrane 6 can be in any shape, including a monolithic, a tubular, a flat and a hollow fiber types. It may be an external pressure type or internal pressure type. A kind of the membrane is preferably an MF membrane or a UF membrane. In this embodiment, a monolithic ceramic MF membrane is used for dead end filtration of the wastewater to give reusable water from which fine solids are removed. As described above, fine solids in the wastewater have formed flocks having good coagulating property, and clogging of the membrane is thus prevented to thereby treat wastewater for a long time to stably give reusable water even in the case that the wastewater contains relatively large amount of organic matters such as treated sewage. However, it goes without saying that regular back washing and chemical cleaning are necessary. Ozone is consumed during membrane-filtration through the separation membrane 6, resulting in less than 0.5 mg/L of concentration of dissolved ozone after membrane-filtration. A concentration of dissolved ozone after membrane-filtration higher than 0.5 mg/L means that an excess amount of ozone is supplied for achieving a purpose of improving coagulation. In this case, an adding amount of ozone must be reduced.

Figure 2:
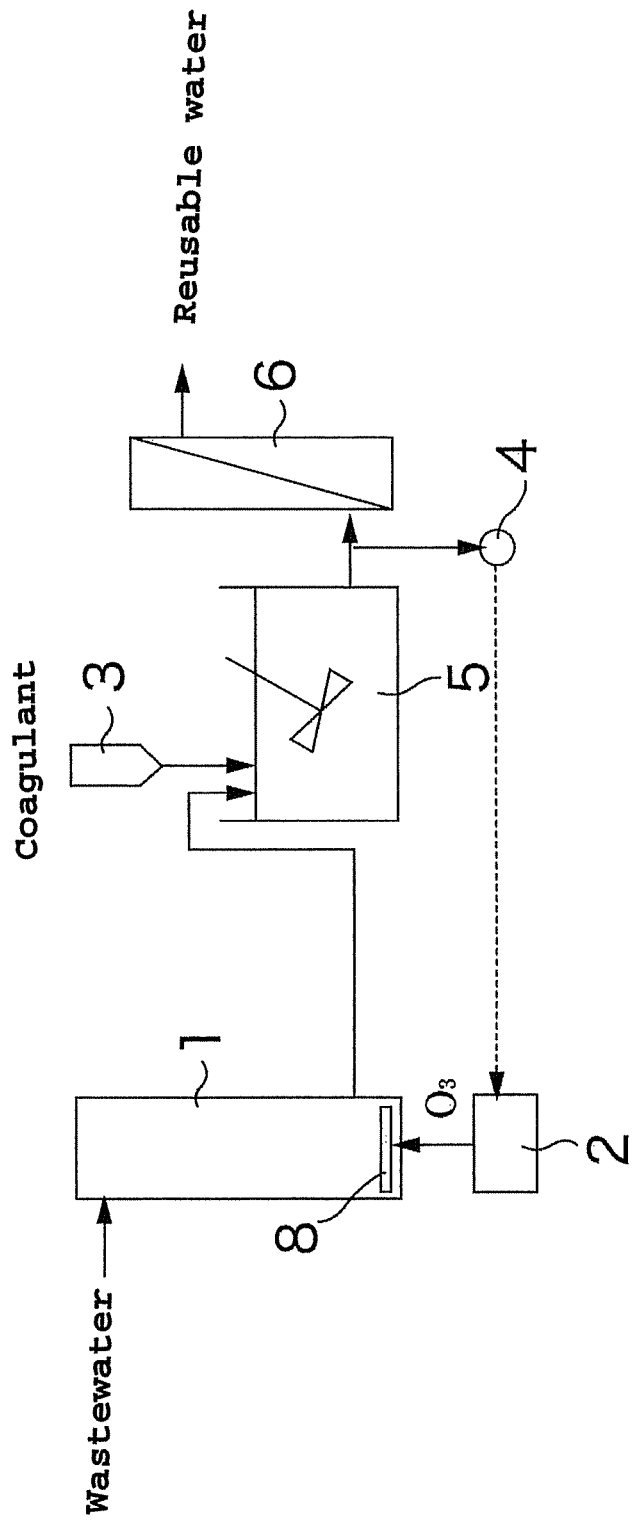
FIG. 2 is a flow sheet showing a variation of the first embodiment of the present invention.

In this embodiment, a concentration of dissolved ozone in wastewater is measured immediately before the step of coagulation with the ozone concentration-measuring device 4. The concentration of dissolved ozone may be measured between the steps of coagulation and membrane-filtration to control adding amount of ozone to such an amount as that the concentration of dissolved ozone before membrane-filtration is less than 1.0 mg/L, as shown in FIG. 2. The reason is that the concentration of dissolved ozone in wastewater stays about the same in the step of coagulation.

Figure 3:
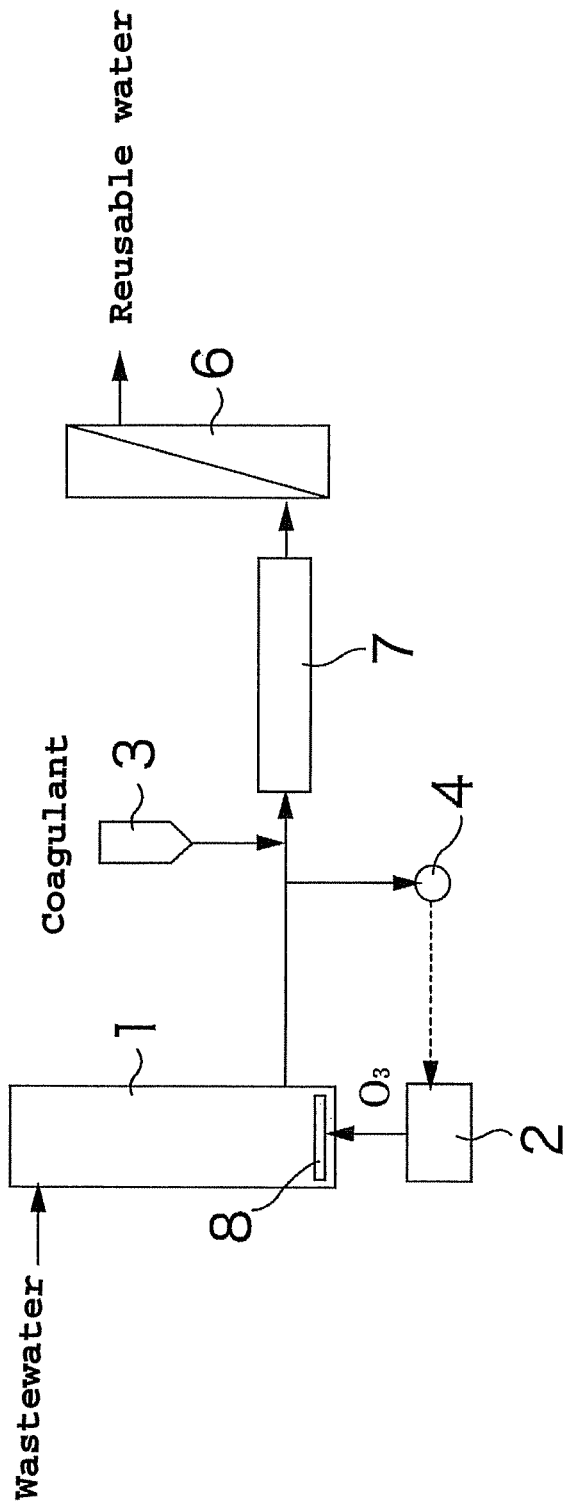
FIG. 3 is a flow sheet showing a second embodiment of the present invention.

FIG. 3 shows a second embodiment of the present invention, in which a line mixer 7 is used instead of the coagulation tank 5 in the first embodiment. The line mixer 7 has a stirring blade fixed in its tube, and may be a commercial product. The wastewater to which a coagulant has been added is stirred during flowing in the line mixer 7 to form flocks. A construction excepting the line mixer 7 is same as of the first embodiment.

Figure 4:
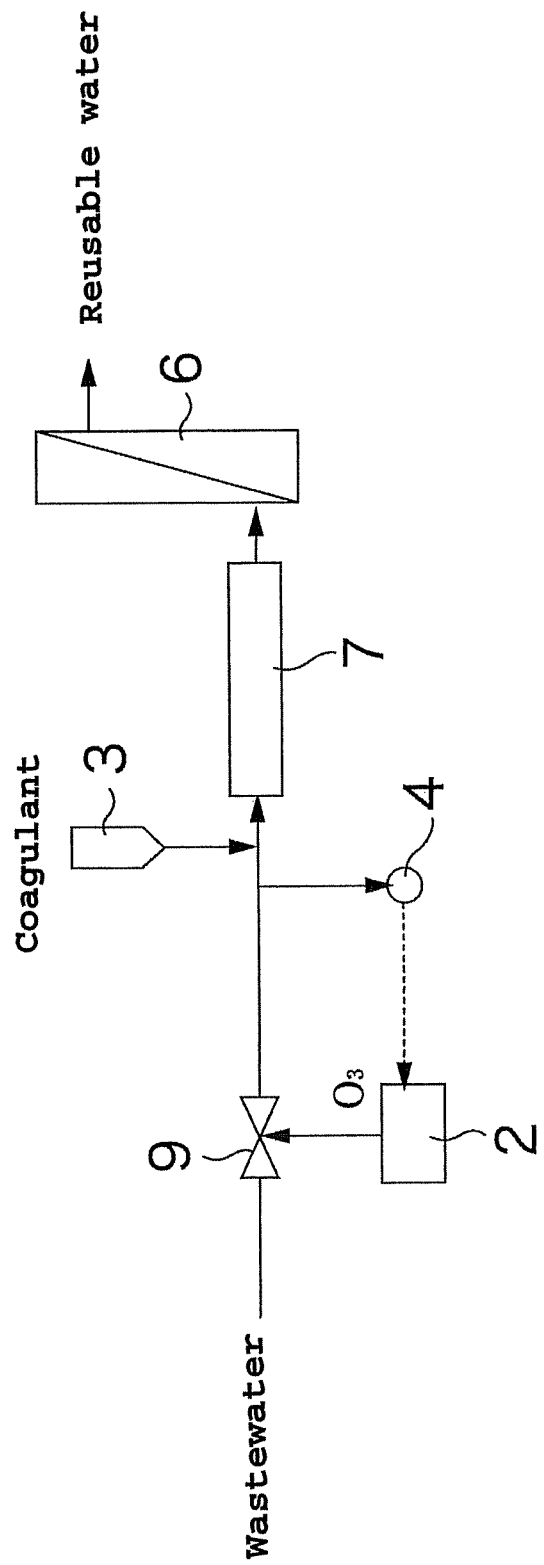
FIG. 4 is a flow sheet showing a third embodiment of the present invention.

FIG. 4 shows a third embodiment of the present invention, in which the ozone contact column 1 is not used and an ejector 9 is used in piping to directly add ozone to wastewater. As described above, ozone can improve coagulation properties in a very short time, and thus the third embodiment in which a period of contacting with ozone is shorter than in the ozone contact column 1 can be employed. In order to efficiently mix ozone with the raw water, ozone may be supplied at a suction side of a water-conveying pump in addition to the ejector 9.

As described above, according to the present invention, even wastewater containing a relatively large amount of organic matters can be treated by membrane-filtration to stably give reusable water with a significantly reduced running cost compared with prior art. In addition, since excessive decomposition of organic matters by ozone can be prevented, a concentration of remaining organic matters in membrane-filtered water can be controlled. A membrane filtration flux also can be increased to about double, compared with cases without ozone.

Examples of the present invention will be described below.

EXAMPLES

According to the flow shown in FIG. 1, experiments of producing reusable water from treated sewage were performed. Each residence time in the ozone contact column was 10 minutes. In Example 1, the ozone generator was controlled so as to keep a concentration of dissolved ozone before membrane-filtration within the range of 0.03 to 0.04 mg/L. In Example 2, the ozone generator was controlled so as to keep a concentration of dissolved ozone before membrane-filtration to 0.4 mg/L. In Example 3, the ozone generator was controlled so as to keep a concentration of dissolved ozone before membrane-filtration to 0.7 mg/L. In each of Examples, a coagulant used was PACl, which was added to wastewater so as to be a concentration of 2 mg⁻Al/L. A separation membrane used was a monolithic ceramic membrane having a fine pore diameter of 0.1 μm. For comparison, experiments were performed in the case of without ozone (Comparative Example 1) and of an ozone concentration of 1.5 mg/L (Comparative Example 2). Results are listed in Table 1.

decreased by half. In Comparative Example 2, in which ozone was added in an amount over the range of the present invention, although a membrane filtration flux was kept at high level as expected, an effect of improving was not higher than Examples. In other words, ozone was wasted to result in higher cost.

The invention claimed is:
1. A method for recycling wastewater comprising:
adding ozone to the wastewater to modify surface properties of organic solids in the wastewater to facilitate coagulation;
adding a coagulant to coagulate the organic solids in the wastewater; and
filtering the wastewater through an ozone-resistant separation membrane to form filtered water,
wherein a dissolved ozone concentration in the wastewater is maintained within a range of about 0.01-0.04 mg/L when measured before adding the coagulant to the wastewater, while substantially maintaining the separation membrane flux.
2. The method for recycling wastewater according to claim 1, wherein contacting ozone with the wastewater is performed in an ozone contact column including an ozone generator.
3. The method for recycling wastewater according to claim 1, wherein contacting ozone with the wastewater is performed by supplying ozone into the wastewater with an ejector or a pump.
4. The method of recycling wastewater according to claim 1, wherein a biological oxygen demand in the filtered water is less than 1 and a chromaticity of the filtered water is in a range of 2 to 3 degrees.
5. The method according to claim 1, wherein the wastewater is stirred after the coagulant has been added to form flocks.
6. A method for recycling wastewater comprising the steps of:
adding ozone to the wastewater to modify surface properties of organic solids in the wastewater to facilitate coagulation;
adding a coagulant to coagulate the organic solids in the wastewater; and
filtering the wastewater through an ozone-resistant separation membrane to form filtered water,
wherein a dissolved ozone concentration in the wastewater is maintained within a range of about —0.01-0.04

TABLE 1

|  |  |  | Treated water (reusable water) | | | | |
| --- | --- | --- | --- | --- | --- | --- | --- |
|  |  | Raw water | Example 1 | Example 2 | Example 3 | Comparative Example 1 | Comparative Example 2 |
| Water quality | SS (mg/L) | 0-3 | <1 | <1 | <1 | <1 | <1 |
|  | BOD (mg/L) | 0-2 | <1 | <1 | 1 | <1 | 2 |
|  | Chromaticity (degree) | 13-19 | 2-3 | 2-3 | 2-3 | 8 | 2-3 |
| Ozone concentration | Before membrane filtration (mg/L) | — | 0.03-0.04 | 0.4 | 0.7 | 0 | 1.5 |
|  | After membrane filtration (mg/L) | — | 0 | 0.05 | 0.2 | 0 | 1 |
| Membrane filtration flux (m/day) |  | — | 4 | 4 | 4 | 2 | 4 |

In Examples 1 and 2, ozone added in a small amount improved coagulation properties of fine solids to prevent clogging of the membrane, and membrane filtration fluxes were kept at high level. By contrast, in Comparative Example 1 without addition of ozone, a membrane filtration flux mg/L—0.01-1.0 mg/L when measured between the steps of adding the coagulant and filtering the wastewater, and the dissolved ozone concentration in the filtered water is less than 0.5 mg/L—while substantially maintaining the separation membrane flux.

7. The method for recycling wastewater according to claim 6, wherein contacting ozone with the wastewater is performed in an ozone contact column including an ozone generator.

8. The method for recycling wastewater according to claim 6, wherein contacting ozone with the wastewater is performed by supplying ozone into the wastewater with an ejector or a pump.

9. The method of recycling wastewater according to claim 6, wherein a biological oxygen demand in the filtered water is less than 1 and a chromaticity of the filtered water is in a range of 2 to 3 degrees.

10. The method according to claim 6, wherein the wastewater is stirred after the coagulant has been added to form flocks.

* * * * *